United States Patent [19]
Gooch et al.

[11] Patent Number: 5,602,704
[45] Date of Patent: Feb. 11, 1997

[54] COMPOSITE METAL AND FERRITE HEAD TRANSDUCER AND MANUFACTURING METHOD THEREFOR

[75] Inventors: Beverly R. Gooch, Sunnyvale; Rex Niedermeyer, Redwood City, both of Calif.

[73] Assignee: Ampex Corporation, Redwood City, Calif.

[21] Appl. No.: 287,459

[22] Filed: Aug. 8, 1994

Related U.S. Application Data

[63] Continuation-in-part of Ser. No. 916,321, Jul. 17, 1992.
[51] Int. Cl.[6] ............................. G11B 5/245; G11B 5/255
[52] U.S. Cl. ................................................................ 360/125
[58] Field of Search ..................................... 360/125, 126, 360/127

[56] References Cited

U.S. PATENT DOCUMENTS

| | | |
|---|---|---|
| 2,711,945 | 6/1955 | Kornei . |
| 3,140,361 | 7/1964 | Eldridge . |
| 3,549,822 | 12/1970 | Chupity . |
| 3,566,045 | 2/1971 | Paine . |
| 3,651,278 | 3/1972 | Chupity et al. . |

(List continued on next page.)

FOREIGN PATENT DOCUMENTS

| | | |
|---|---|---|
| 0061069 | 9/1982 | European Pat. Off. . |
| 216604 | 8/1990 | Japan . |

OTHER PUBLICATIONS

The Complete Handbook of Magnetic Recording, 3rd Ed., Finn Jorgensen, 1988, pp. 204 through 208.
Magnetic Recording, vol. 1, Technology, 1987, C. Denis Mee & Eric D. Daniel pp. 315 through 325.
Videotape Recording, Ampex Corporation, 1986, pp. 43 through 46.
Phillips Technical Review, vol. 44, No. 5, Nov., 1988, pp. 151–160, by J. P. M. Verbunt, "Laboratory–scale manufacture of magnetic Heads".

(List continued on next page.)

Primary Examiner—Stuart S. Levy
Assistant Examiner—George J. Letscher
Attorney, Agent, or Firm—John G. Mesaros; George Almeida; James M. Thomson

[57] ABSTRACT

A magnetic transducer is batch fabricated from a pair of confronting elongate composite block substrates each formed of a thin cap of non-magnetic material bonded to a much larger block of magnetic material, such as ferrite. An intermediate winding groove is formed in proximate relation to the non-magnetic material along the length of one or both composite block substrates. One (or both) of the substrates is provided with a plurality of parallel spaced V-shaped grooves oriented in a direction perpendicular to the winding groove, wherein adjacent grooves form therebetween track width defining [prtopms. A core layer of high permeability magnetic material, such as Alfesil material, is deposited over the edges whereby magnetic poles are formed of the edges. A gap layer of insulating material is deposited on the edges over the high permeability magnetic material. Two of the composite block substrates are placed with the edges in aligned abutting relation and are assembled by glass bonding. Individual transducers are sliced from the bonded assembly of substrates and are lapped and polished and a coil is added to provide the finished transducers. Alternative embodiments may employ winding and V-shaped grooves in only one composite block substrate with the matching substrate being flat, and/or may employ either rectangular solid or wedge-shaped non-magnetic caps bonded to the ferrite blocks.

24 Claims, 9 Drawing Sheets

U.S. PATENT DOCUMENTS

| | | | |
|---|---|---|---|
| 4,219,853 | 8/1980 | Albert et al. | 360/103 |
| 4,242,711 | 12/1980 | Sata et al. | 360/126 |
| 4,291,354 | 9/1981 | Chase | 360/129 |
| 4,404,608 | 9/1983 | Yasuda et al. | 360/126 |
| 4,635,153 | 1/1987 | Shimamura et al. | 360/125 |
| 4,638,811 | 1/1987 | Diepers et al. | 360/125 |
| 4,667,260 | 5/1987 | Perlov et al. | |
| 4,710,838 | 12/1987 | Jahnke | 360/125 |
| 4,716,484 | 12/1987 | Kaminake et al. | 360/125 |
| 4,780,779 | 10/1988 | Pisharody et al. | 360/120 |
| 4,782,416 | 11/1988 | Hillenbrand et al. | 360/125 |
| 4,811,146 | 3/1989 | Niwa | 360/119 |
| 4,816,949 | 3/1989 | Yamada et al. | 360/120 |
| 4,819,112 | 4/1989 | Iwata et al. | 360/126 |
| 4,819,113 | 4/1989 | Kubota et al. | 360/126 |
| 4,837,924 | 6/1989 | Lazzari | 360/125 |
| 4,839,763 | 6/1989 | Matsuzawa | 360/126 |
| 4,868,698 | 9/1989 | Takahashi et al. | 360/126 |
| 4,873,599 | 10/1989 | Sueoka | 360/126 |
| 4,888,658 | 12/1989 | Oneo et al. | 360/126 |
| 4,901,179 | 2/1990 | Satomi et al. | 360/126 |
| 4,941,054 | 7/1990 | Tottori et al. | 360/120 |
| 4,972,285 | 11/1990 | Otomo et al. | 360/126 |
| 5,047,885 | 9/1991 | Zama et al. | 360/126 |
| 5,173,823 | 12/1992 | Hasegawa | 360/120 |
| 5,222,006 | 6/1993 | Yanagi | 360/126 |
| 5,245,488 | 9/1993 | Iwamoto et al. | 360/119 |

OTHER PUBLICATIONS

Patent Abstracts of Japan, vol. 14, No. 234, [P–1048][4173], 16 May 1990 & JP, A, 20 54 407 [NEX KNASAIL.TD.] 23 Feb. 1990.

Patent Abstracts of Japan, vol. 11, No. 066 [P–552] 27 Feb. 1987 & JP, A, 61 229 210 [Canon Electronics, Inc.] 13 Oct. 1986.

Patent Abstracts of Japan, vol. 14, No. 534 [P–1135] 26 Nov. 1990 & JP, A, 22 26 508 [Nippon Chemicon Corp.] 10 Sep. 1990.

Patent Abstracts of Japan vol. 8, No. 75 [P–266][1512] 7 Apr. 1984 & JP, A, 58 220 232 [Nippon Victor K.K.] 21 Dec. 1983.

Patent Abstracts of Japan, vol. 13, No. 361 [P–917] 11 Aug. 1989 & JP, A, 11 19 904 [Sony Corp.] 12 May 1989.

Patent Abstracts of Japan vol. 15, No. 343 [E–1106] 30 Aug. 1991 & JP, A, 31 31 006 [Alps Electric Co. Ltd.] 4 Jun. 1991.

COMPOSITE METAL AND FERRITE HEAD TRANSDUCER AND MANUFACTURING METHOD THEREFOR

CROSS-REFERENCE TO RELATED APPLICATION

This application is a continuation-in-part of copending patent application Ser. No. 07/916,321 filed Jul. 17, 1992.

The subject matter of this invention is related to the subject matter of U.S. patent application Ser. No. 07/845,894, filed Mar. 4, 1992, now issued as U.S. Pat. No. 5,267,392 on Dec. 7, 1993, entitled "Laminated, High Frequency Magnetic Transducer and Manufacturing Method Therefor" by Beverley R. Gooch and George R. Varian, and U.S. patent application Ser. No. 07/846,454, now abandoned entitled Small Core Metal Head Transducer and Manufacturing Method Therefor, filed Mar. 4, 1992, by Beverley R. Gooch, such applications being assigned to the now assignee of the present invention. The latter application serial number 07/846,454, now abandoned is hereby incorporated by reference as though fully set forth herein.

BACKGROUND OF THE INVENTION

This invention relates generally to magnetic head transducers and more particularly to a metal and ferrite composite magnetic video head transducer using sputtered strips for forming the core legs thereof.

The performance of a magnetic tape data recorder depends heavily on the properties of the magnetic materials used to make the recording heads and tapes and on the structural configuration of these materials which influence their magnetic properties. Magnetically hard materials, characterized by their high remanence, high coercivity, and low permeability, are chiefly used in the manufacturing of the recording tape and other related recording media. On the other hand, magnetically soft materials, which exhibit low coercivity, low remanence, and relatively high permeability, are commonly utilized to make the magnetic cores for the heads which are the means by which electrical signals are recorded on and reproduced from the magnetic tape.

The typical ring-type magnetic head is composed of two highly permeable magnetic cores, with a non-magnetic gap spacer and a coil to which signal information is connected. The record head is a transducer that changes the electrical energy from the signal system into a magnetic field that is emitted from a physical gap in the head which impresses a magnetic pattern on the magnetic tape proportional to the electrical signal. The reproduce head, conversely, is a transducer that collects the flux from the magnetic tape across a physical gap and changes it into an electrical signal that is proportional to the recorded flux.

Ferrite materials have been conventionally used as the magnetic material in video heads. The advent of high-definition video tape recorders, digital video tape recorders, computer digital data storage devices and the like, with the resultant use of high coercivity recording media such as metal powder media, metal evaporated media etc., have accelerated the trend towards high density construction for recording even larger amounts of information. As part of this evolution, there is the resultant need to increase the density of the information signal recorded on the medium. Conventional ferrite cores have significant limitations in providing the desired characteristics to achieve the required performance for these applications.

There are performance problems with ferrite heads, particularly when such heads are used with high coercivity magnetic tape, and particularly during the recording process. During recording, larger signals are required with high coercivity magnetic tapes than with conventional magnetic tapes. The problem is not severe with the use of a ferrite head during reproduce operations, since signal levels from the tape are much lower in magnitude. With higher recording signals, the signal tends to drive the ferrite heads into saturation. During reproducing or "playback", it has also been observed that there is a significant noise level resulting from contact of such high coercivity magnetic tapes with the ferrite heads, called multiplicative noise which, in turn, requires higher head efficiencies to achieve an acceptable signal-to-noise ratio. Bulk metal heads likewise have performance disadvantages, principally in that they have poor high frequency response.

The above considerations have led to the use in recording heads of any number of other commercially available magnetic materials which have higher flux density saturation, such materials including cobalt-zirconium-niobium (CZN) alloys, iron-aluminum-silicon alloys including Alfesil, Sendust, Spinalloy, or Vacodur each having a nominal composition of 85% iron, 6% aluminum, and 9% silicon, and also amorphous metals.

Besides the magnetic properties of the head core materials used, the critical design considerations that dictate performance of the heads are track width, gap length, gap depth, and core geometry (e.g. path length). Each of these parameters must be selected in accordance with the design criteria of the magnetic tape recorder, while, at the same time, maintaining the head efficiency as high as possible.

In miniaturized transducers, signal coupling is extremely important, and much of the efficiency is determined by the gap to core reluctance, that is, $E=Rg/Rg+Rc$. If the reluctance of the core is negligible relative to the reluctance of the gap, the efficiency approaches unity. In many instances, in miniaturized transducers, matching transformers are required for impedance matching and amplification to the preamplifier circuitry. However, such matching transformers introduce an additional element of noise in the signal. If a winding window in the transducer is simply made larger to accommodate more windings, the larger window area increases the magnetic path length and, in turn, reduces the head efficiency. To counteract this reduction in efficiency, a gap depth reduction can be made; however, this, in turn, reduces the life of the head or transducer.

Attempts have been made to provide transducers with better wear characteristics and longer life, for example, by plasma arc sputtering of an Alfesil layer on the tape contacting surface of a ferrite core transducer, such as shown and described in U.S. Pat. No. 3,566,045, issued to Paine on Feb. 23, 1971.

In U.S. Pat. No. 2,711,945, issued to Kornei on Jun. 28, 1955, a core of magnetically soft material is provided with metallic high permeability pole shoes which are disposed for contact with the moving tape, the poles being intended to provide a sharp well-defined, narrow transducing gap and thus avoid the attendant wear disadvantages of the soft core material which, in one embodiment is a ferrite or iron powder.

Composite video head transducers, such as the Kornei transducer have been around since the mid-fifties. Other such composite transducers utilized slabs or blanks of one material adhered to ferrite core material in side-by-side relationship. For example, one such transducer included a toroidally shaped ferrite core with first and second confronting Alfenol metal pole tips with a gap spacer between them and held in contact with a lateral surface of a slotted ferrite ring core, with the pole tips extending beyond the circumference of the ferrite ring core in a plane adjacent to the lateral surface. Another such composite head includes first and second generally planar Alfesil core blocks brazed together with a ferrite core member of shorter length abutted to one side of the brazed combination with the Alfesil core blocks protruding beyond the length of the ferrite core member. In both of these transducers the protruding portion contacted the tape during use.

There exists, therefore, a significant need for an improved high frequency magnetic transducer having an optimum number of signal windings with a short magnetic path to reduce core reluctance and to make the head efficiencies less dependent on the permeability of the magnetic material used in the magnetic cores, and to eliminate the need for a transformer. In addition, losses should be minimized, leakage reluctance should be reduced, and the core material must not be driven into saturation when used at normal recording signal levels. The fabrication of such a transducer should be high volume, high accuracy, low cost and achieve a high degree of uniformity. The present invention fulfills these needs and provides further related advantages.

SUMMARY OF THE INVENTION

The foregoing and other objects of the invention are accomplished by providing an improved tri-composite magnetic transducer for reproducing and/or recording high frequency signals on a magnetic tape medium. In one embodiment, the transducer includes first and second generally identical composite block sections or substrates, each formed of a non-magnetic block bonded to a ferrite block. The sections, when bonded together in opposing relation, form a composite transducer having opposed winding receiving recesses in the side edges thereof in proximity to the head contact surface and a formed winding opening adjacent the pole tips. The winding opening and recesses are arranged for receiving coil turns therethrough for providing the coil about the recesses in a plane generally parallel to the head contact surface of the transducer. The core legs essentially are formed of two layers of Alfesil material, or the like, applied, such as by sputtering, on confronting edges of the pair of composite ferrite and non-magnetic composite blocks, which then are bonded together.

In alternative embodiments, the first and second composite block sections may not be identical, either in size and/or configuration. For example, the winding opening and/or the V-shaped, track width defining grooves described below, may be formed in one section only, and the non-magnetic block may be rectangular or tapered in shape as further described below. Thus, in the various embodiments, each core section is formed as a portion of an elongate composite block substrate, initially shaped to provide opposing elongate bonding notches on opposite edges of a common surface, and a winding window groove in one or both of the ferrite portions in proximate relation to the non-magnetic portion of the substrate.

More particularly, the composite block sections or substrates are formed substantially of a ferrite block having a non-magnetic cap block or layer of shallow dimensions bonded thereto, the cap block being at a location for providing the head-to-tape contact surface. Thereafter one or both substrates are provided with an array or a plurality of equally spaced V-shaped, track width defining grooves oriented in a direction perpendicular to the winding window groove. The track width defining grooves are of a depth sufficient to provide a plurality of adjacent, generally parallel isolated core sections. A chrome adhesion layer is deposited on the grooved surface and into the winding groove, and/or is deposited on the flat surface of the substrate which is not grooved or formed with a winding window. The chrome layer is followed by a magnetic core layer of suitable magnetic material, such as Alfesil material. The magnetic core layer then has deposited thereon, such as by sputtering, a chrome adhesion layer, followed by a gap layer of suitable insulating material such as aluminum oxide or silicon dioxide. Two of such substrates are then placed in opposing aligned abutting relation and glass bonding is effected by means of the two bonding notches. The temperature and time of flow of the glass is controlled to preclude the flow of glass into the winding windows. The thus bonded substrates are sliced into individual core sections or head workpieces. The cap block is radiused and narrowed in width to provide a narrow arc of non-magnetic tape contact material disposed generally centrally relative to the width of the ferrite block, with a narrow track width. The front gap depth is of a dimension generally equal to or greater than the thickness of the non-magnetic material in the gap region, depending upon the embodiment. The winding window may be formed within the junction of the ferrite and cap blocks, or may commence at a selected point spaced from the junction of the ferrite and non-magnetic cap block. The window is of an areal dimension to accommodate a large number of coil windings which are arranged through the winding window and within the side edge recesses on a line generally parallel to the tape contact surface, to enhance flux efficiencies without the need for matching transformers in the signal path.

The magnetic core sections are extremely small which, in combination with the unique physical relationships of the cap blocks, ferrite blocks and winding windows, provides an unusually short magnetic path length. Thus, the core reluctance is reduced by decreasing the magnetic path length, whereby the head efficiency is made more dependent on the gap reluctance and, hence, is less frequency dependent. With the extremely short magnetic path and with a large volume of ferrite material in the core sections, the core reluctance is lowered further, resulting in significant gains in flux efficiency, particularly in the megahertz frequency range. The non-magnetic cap block, the composition of which is selected for its wear characteristics, and particularly for its fracture toughness property, is very shallow in dimension and thus the reluctance from the tape contact surface to the ferrite core can be minimized.

As previously mentioned, the invention contemplates several/embodiments, wherein the physical arrangement, relative dimensions, block shape, etc., are varied accordingly. To illustrate, a first embodiment may included identical composite block sections each having the confronting track width defining grooves and winding window grooves of previous mention. A second embodiment may include the confronting track width defining grooves, but may include a winding window groove in the confronting surface of only one of the composite block sections. Another embodiment may include track width defining grooves in the confronting surface of only one of the composite block sections, with the confronting surface of the opposite composite block section being flat with no grooves. Additionally, the flat surfaced section or substrate may be smaller in width than the opposite section. In further embodiments, the cap block of non-magnetic material may be a rectangular solid in shape, or may be of a truncated wedge-shape with the bonding surface of the respective ferrite block being beveled to match the angle of the wedge. In the various embodiments, the winding window opening may extend partially into the non-magnetic cap blocks, or may be located slightly spaced below the junction of the cap blocks and ferrite blocks, that is, may be situated entirely within one or both ferrite blocks. Examples of the various embodiments of previous mention and the corresponding variations in the process for manufacturing the embodiments is fully described in the specification and accompanying drawings below.

The various transducers may be fabricated by high volume production with extremely high accuracy, and low cost techniques such as material deposition processes. With such batch fabrication, all of the magnetic core material for a large number of transducers is deposited during the same process step and all of the transducing gaps are formed at the same time. This results in a high degree of uniformity for all of the transducers.

Other features and advantages of the present invention will become apparent from the following detailed description, taken in conjunction with the accompanying drawings in which like reference numerals refer to like elements in the several views.

DETAILED DESCRIPTION OF THE PREFERRED EMBODIMENT

Figure 1:
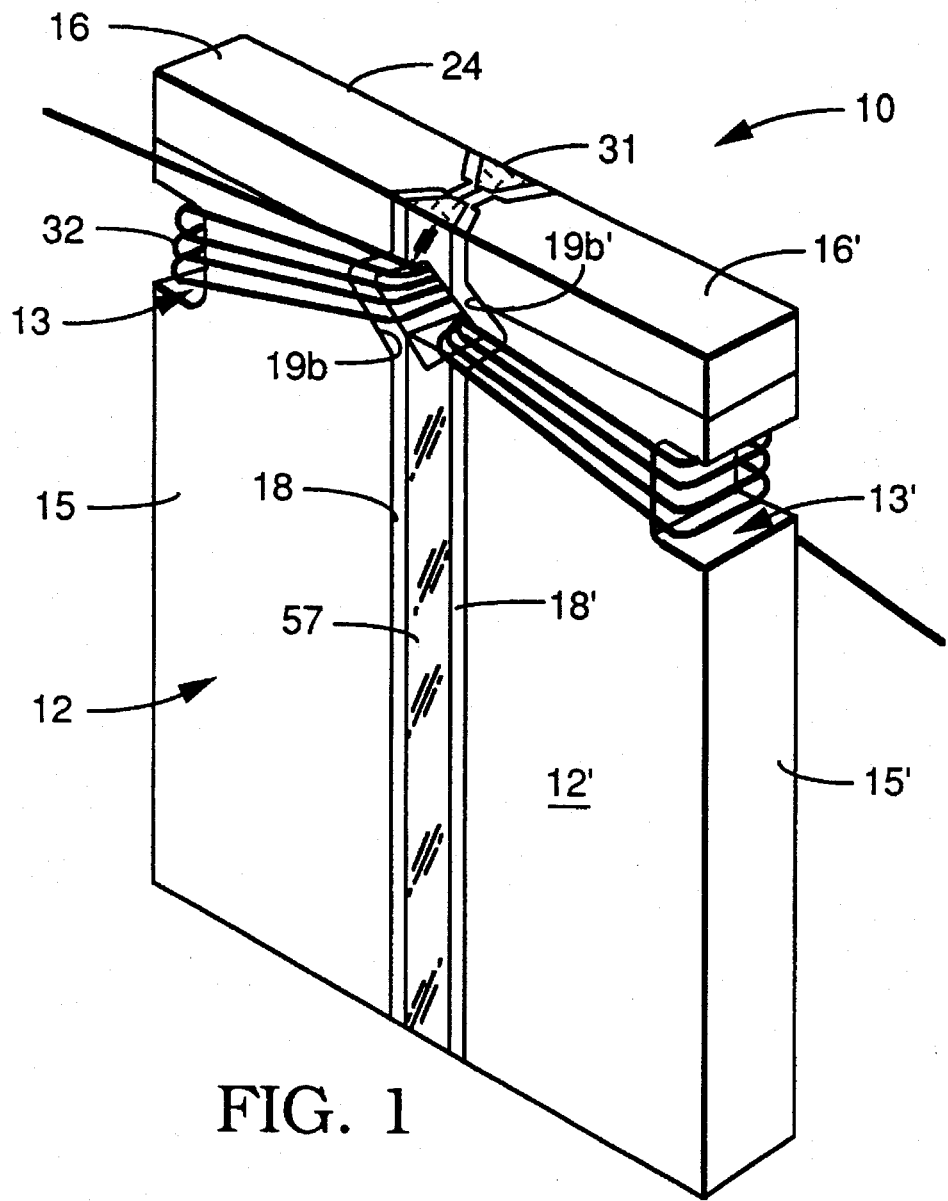
FIG. 1 is a perspective view of the completed composite metal and ferrite transducer according to the invention.

Referring now to the drawings, and particularly to FIGS. 1 through 4, there is shown a head or transducer, generally designated 10, the transducer 10 being formed of first and second composite core sections or halves, generally designated 12, 12', which as will become apparent during the discussion of the fabrication thereof, may be identically configured halves in this embodiment, both of which may be formed at the same time, if desired. The transducer 10, as assembled, is formed as a generally plate-shaped member of thin cross-section, which is formed such as by slicing two block arrays of transducer halves after the two blocks are aligned and bonded together. The transducer 10 is formed as a composite structure of a ferrite block portion 15, 15' and a thin non-magnetic cap layer or block portion 16, 16' and includes the first and second generally identical core sections or halves 12, 12', which, when bonded together in opposing relation, form a transducer having aligned edge winding recesses 13, 13', and a centrally disposed formed winding opening 19b, 19b' aligned with the gap 31 adjacent the pole tips. The winding opening and recesses are arranged for receiving turns of a signal coil 32 therethrough for providing the coil 32 on a line generally perpendicular to, and in proximity to, the gap 31 of the transducer 10. Confronting core legs 18, 18' are formed of two strips of high permeability magnetic alloy material, such as Alfesil material, or the like, deposited or sputtered on a face of confronting edges of the composite block substrates. In the instant embodiment, sputtering of the Alfesil material is preferred.

Figure 4:
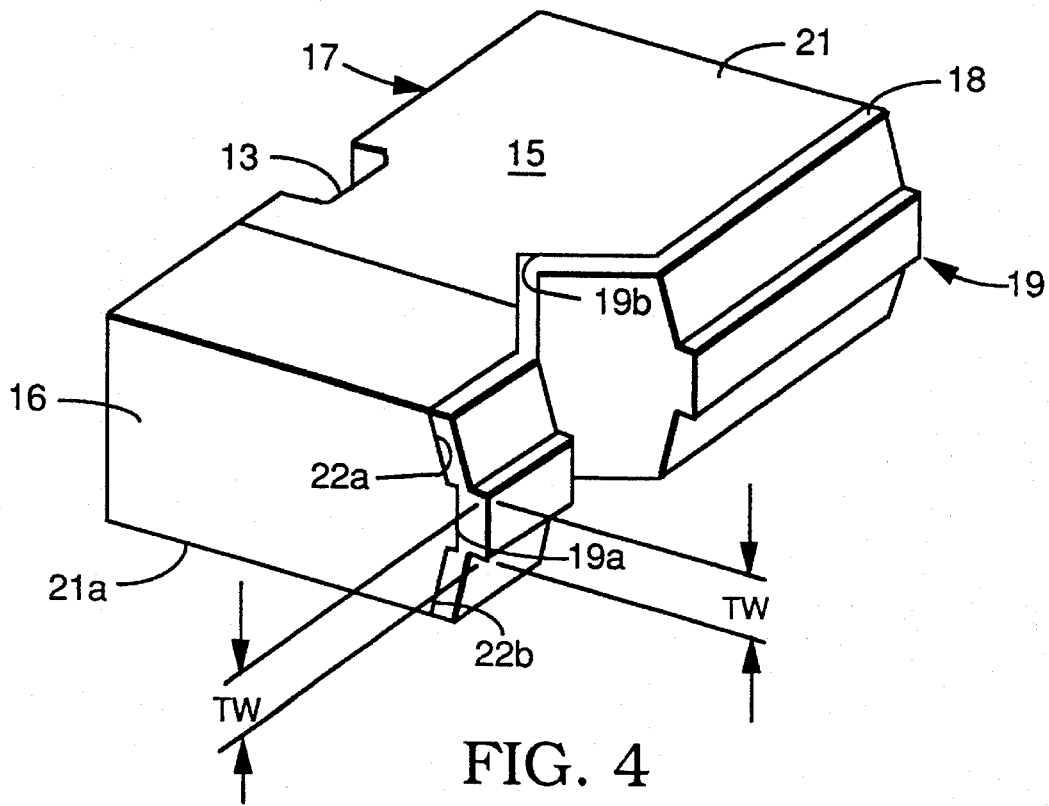
FIG. 4 is a perspective view of a transducer head section used with a like section to form the body of the transducer of FIG. 1.

Each core section or half 12, 12' is formed as a portion of an elongate composite ferrite and non-magnetic material block substrate 20 (See FIGS. 5 through 8), formed, for example, of the ferrite block 15 and the cap block of non-magnetic material 16 bonded thereto, with the ferrite block 15 being of substantially greater dimension and volume than the non-magnetic cap block 16. As best depicted in FIG. 4, the core section 12 is formed as a thin plate-shaped or block-like structure of ferrite material 15 overlaid with and bonded to an upper shallow or thin block of the non-magnetic material 16 of the same width and length, the composite structure having a first generally planar outer edge 17, with a recess 13 optionally formed therein in proximate relation to and displaced slightly below the junction of the two materials. The opposite edge, generally designated 19, includes a narrow strip-like land or pole face 19a and a V-shaped groove 19b extending in a direction transverse to the face 19a and between the outer planar side surfaces 21, 21a. On either side of the pole face 19a, there are rearwardly tapered sections 22a, 22b, of like dimension and angle with the pole face 19a protruding slightly outwards from the sections 22a, 22b. The width of the pole face 19a defines the track width, designated TW in the various figures. The apex of the V-shaped groove 19b is formed within the ferrite material 15 and is in general alignment with the center of the recess 13, with the upper terminal edge of the groove 19b in one embodiment extending into the non-magnetic cap layer or block 16. In an alternate embodiment the upper terminal edge of the winding groove 19b is slightly spaced from the junction of the cap 16 and the ferrite material 15, as further described below. The core leg 18 is formed by depositing, such as by sputtering, a high permeability magnetic alloy material on the surfaces of land or pole face 19a, the tapered sections 22a, 22b and the V-shaped winding groove 19b.

Referring now to FIGS. 5 through 8, the composite block substrate 20 is initially formed by starting with a block 15 of ferrite material to which is bonded a cap layer or block 16 of non-magnetic material, the block 15 being substantially greater in dimension and volume than the cap block 16. The cap block 16 has the same length and width as the areal surface of the upper surface of block 15. The composite block substrate 20 is then shaped to provide opposing elongate glass bonding notches 26 (at the lower edge of ferrite block 15), 28 (at the upper edge of non-magnetic cap block 16) on opposite long corners or edges of a front or common surface 22 (FIG. 5), and an elongate winding groove 19b in proximate relation and generally parallel to the upper surface of the non-magnetic cap block 6. Thereafter the workpiece is provided with an array or a plurality of equally spaced V-shaped track width defining grooves 40a–40j oriented in a direction perpendicular to the winding groove 19b. The track width grooves 40a–40j are of a depth sufficient to provide a plurality of adjacent, generally parallel core sections, with the width of the land 19a defining the track width TW (FIG. 4).

A thin chrome adhesion layer (not shown) is deposited on the grooved common surface 22 (including the lands 19a and the tapered sections 22a, 22b) and into the winding groove 19b, followed by a core layer, generally designated 18 (FIG. 6), of suitable high permeability magnetic material, such as Alfesil (Sendust) material. Alternatively, a cobalt-zirconium-niobium or permalloy alloy may be employed, but in the preferred embodiment, Alfesil is used. The Alfesil layer on the grooved common surface 22 then has deposited thereon a second thin chrome adhesion layer (not shown), followed by an insulating, or gap layer (not shown) of suitable material such as aluminum oxide or silicon dioxide. The chrome adhesion layers and the thin insulating gap layer are not shown in the drawings of FIGS. 5–8 due to the relative thinness of the layers and addition to the drawings of such layers would unduly complicate the figures.

Figure 13:
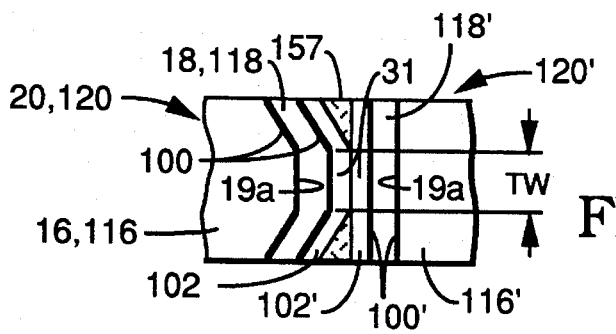
FIG. 13 is an enlarged top plan view of the non-magnetic caps and the layers confined there between which define the transducer gap.

However, by way of example only, FIG. 13 depicts and in enlarged top view a section of a gap structure showing the various layers deposited on the facing edges of the block substrates 20,20' in particular here, on the cap blocks 116, 116'. Thus, a chrome adhesion layer 100, 100' is deposited on the edge surfaces of cap blocks 16, 116 and 16', 116', respectively followed by a deposit of the magnetic core layers 18, 118 and 118', respectively. Then another layer of chrome 100, 100' is deposited, and thereafter respective gap layers 102, 102' are deposited on the chrome layers. Half of the desired thickness of the gap length is deposited on either block substrate where, upon assembly and bonding, the combined gap layer halves form the final gap 31. In the embodiment shown, the confronting edge of substrate 20' is flat, and the track width TW thus is defined by the pole face or land 19a of substrate 20. For purposes of facilitating the illustration of the layers, the dimensions thereof are not to scale or proportional.

Figure 8:
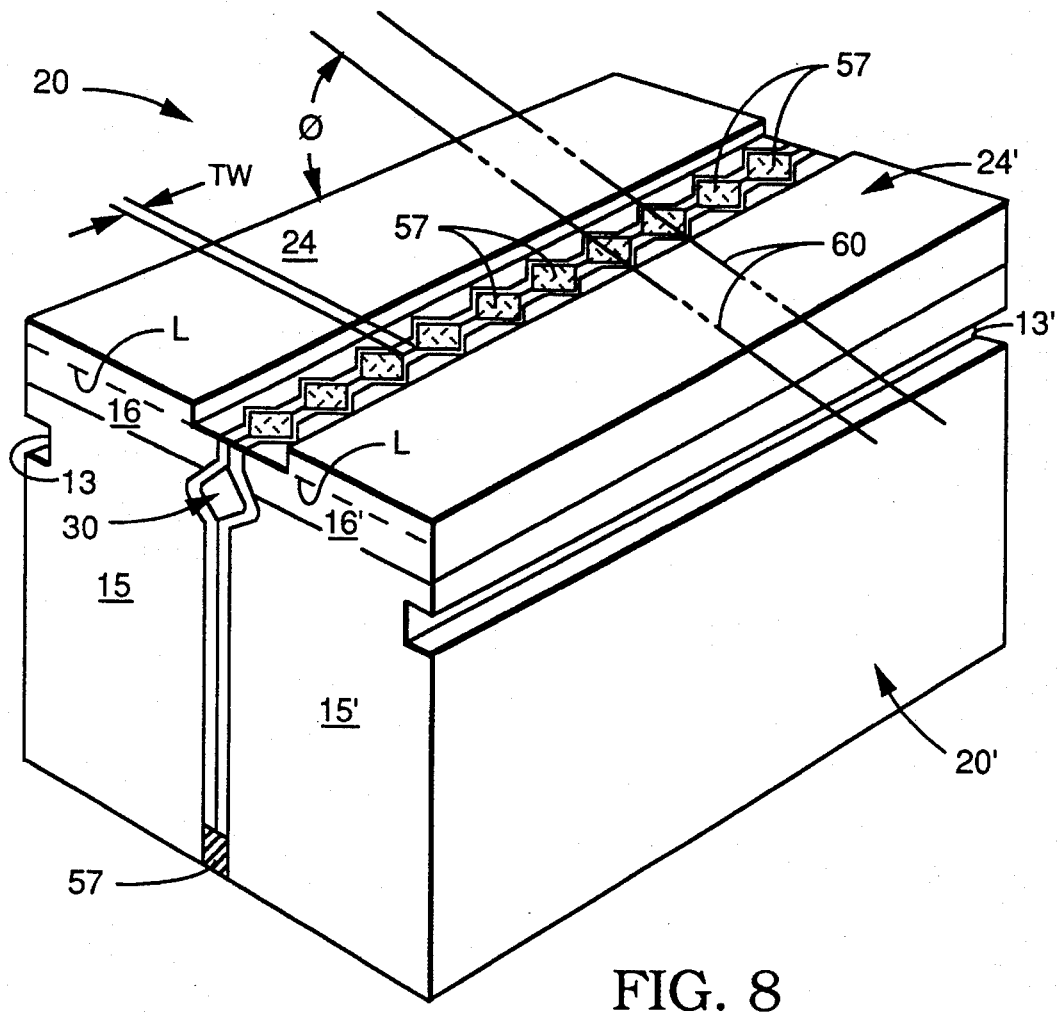

Two of the workpieces containing multiple composite block substrates 20, 20' are then placed in opposing aligned abutting relation and glass bonding is effected by means of the two grooves formed by the two pairs of opposing bonding notches 26, 28, the temperature and time of flow of the glass 57 being controlled to preclude flow of glass into the winding windows (FIG. 8).

Figure 5:
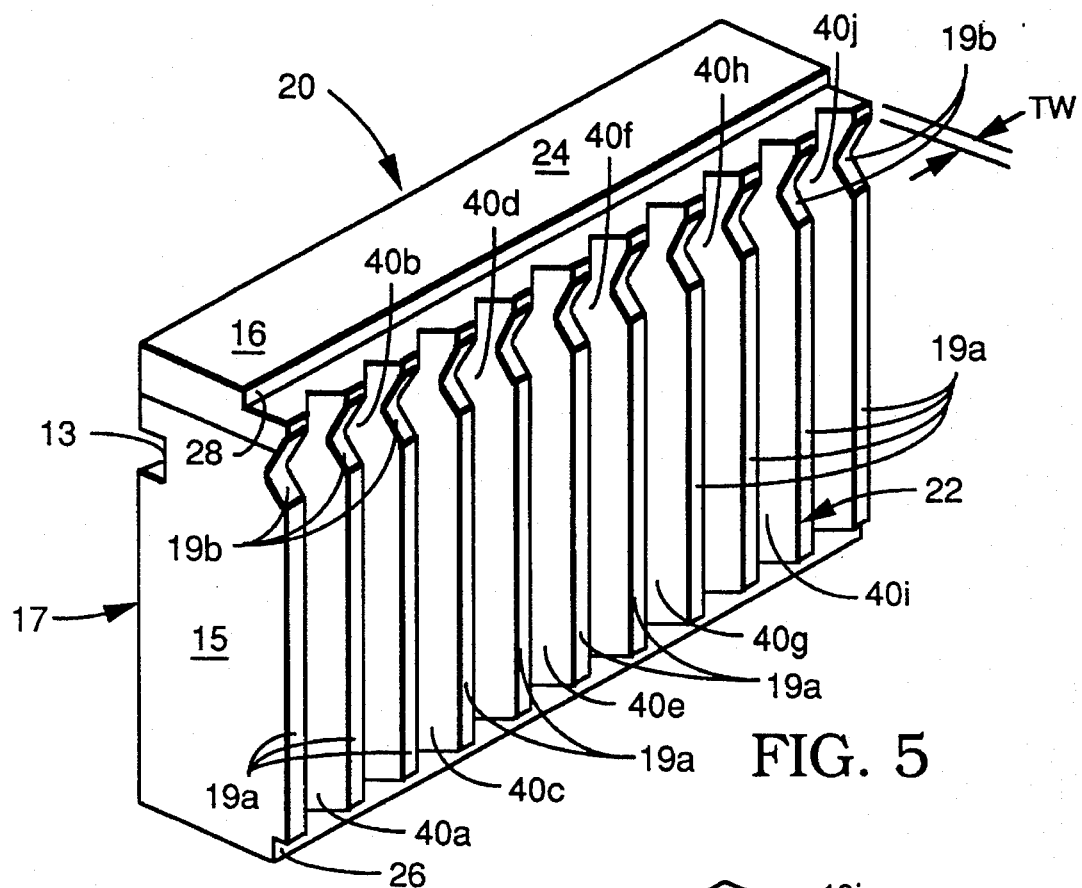
FIGS. 5 through 8 are perspective views showing the sequential method steps utilized in the fabrication and assembly of the sections of the transducer of FIG. 1.

For assembly and fabrication, there will now be described the sequential method steps utilized in the fabrication of each core section or half 12, 12' of one embodiment of the magnetic transducer 10 of the present invention. Referring specifically to FIG. 5, the starting point in the method is the use of a generally elongate thin multiple block substrate, or workpiece 20, formed of the first block 15 of ferrite material capped with the thinner block 16 of a suitable non magnetic, non-conducting material such as calcium titanate, zirconia, other ceramic material or other comparable dielectric materials. A laminated magnetic metal structure may be used in place of ferrite to form the substrate. The substrate or workpiece 20, at the outset, has at least first and second mutually perpendicular surfaces, generally designated 22 and 24, the surface 22 (after forming grooves 40a–40j) hereinafter being referred to as the common surface of previous mention, and the surface 24 hereinafter being referred to as the head edge surface. The substrate or workpiece 20 is then shaped by conventional machining methods or by a reactive ion beam etching (RIBE) to form the first and second longitudinally extending right-angularly configured bonding notches, generally designated 28 and 26, respectively, in the upper and lower (as viewed in the drawings) longitudinal edges of substrate 20. The notches 28, 26 are of generally equal depth (in a direction perpendicular to the common surface 22) and formed so that one surface thereof is generally perpendicular to the common surface 22. The coil winding groove 19b may be formed in the surface 22 of the substrate 20 adjacent the upper edge thereof just below the junction of the blocks 15 and 16, in proximate relation to, but displaced from, the upper bonding notch 28. However in the embodiment here, the groove is shown with upper apex protruding into the cap layer 16 or as close thereto as possible. The winding groove 19b may take any convenient configuration, such as V-shaped, U-shaped or semicircularly shaped, the primary function dictating the configuration and depth of the groove 19b being that it be of sufficient dimension to receive the coil winding 32 when bonded to another section as will be described.

The partially fabricated workpiece or substrate 20 is then provided with a plurality of equally spaced track width notches 40a–40j, the notches 40a–40j extending in a direction perpendicular to the head edge surface 24, and being of a depth which approximates half the depth of the bonding notches 26, 28. The track width notches may be formed by any convenient method, that is, by conventional machining techniques or by reactive ion beam etching, but, in any event, the forming leaves the lands or pole faces 19a in a bar-shaped configuration, that is, opposite edges of the lands 19a are parallel to one another. The track width notches 40a–40j are symmetrical in the horizontal plane, that is, they are preferably V-shaped in cross-section, as a consequence of which, after slicing as will be hereinafter described, the pole tips 19a, are generally trapezoidally configured in cross-section (See FIGS. 2 and 4), with the width of the forward bar-shaped edge of the trapezoid defining the track width, designated TW, and which is about 0.002 inch. To complete the workpiece 20, the surface 17 opposite surface 22 is grooved or notched along its length at a position just below the junction of the two blocks 15 and 16 to form the winding receiving recess 13. The recess 13 is not necessary to the invention but does provide a convenience for winding of the coil 32.

After formation and shaping of the substrate or workpiece 20, an adhesion layer (not shown) of a suitable substance, such as chrome (see FIG. 13) is deposited on the surface 22, followed by a core layer 18 of a suitable high permeability magnetic alloy material, such as Alfesil, which is an iron-aluminum-silicon alloy having a nominal composition of 85% iron, 6% aluminum, and 9% silicon. The Alfesil core layer 18 sputters into the track notches, that is, it coats the tapered sections 22a, 22b as well as the land 19a to form a composite metal and ferrite core half as shown in FIG. 4 with intimate magnetic coupling between the layer 18 and the ferrite block 15. The choice of composition for the adhesion layer is dictated by compatibility with the composition of the two materials of the substrate 20 or workpiece as well as compatibility with the composition of the core layer 18. The chrome layer and Alfesil core layer 18 may be deposited by any suitable means such as sputtering, with the chrome layer thickness being extremely nominal and of the order of 1 to 2 micro inches. The core layer 18 is of a thickness of about 180 to 220 micro inch and, essentially forms the magnetic core of the head 10. In depositing the chrome adhesion layer and the core layer 18, the bonding notches 28, 26 are protected in any suitable manner to preclude depositing of material thereon, such as by using masking techniques or the like.

Thereafter additional layers are deposited. First there is deposited a second thin adhesion layer (FIG. 13) of about 1 to 2 micro inches of chrome followed by an insulation or gap layer (FIG. 11), this thickness of the gap layer being one half the desired track gap spacing. In this embodiment, the gap layer is approximately 6 micro inches, resulting in a gap length of the order of 12 micro inches. In practice, 10 to 15 micro inches is the gap length for a playback head. In a record head, the gap length may be of the order of twice the length or 20–25 micro inches. The chrome adhesion layer is optional and may be omitted provided that there is proper adhesion between the insulation or gap layer and the core layer 18 in the fabrication process employed. However, the chrome layer also is a barrier layer which prevents any contamination of the ferrite by the core layer 18 and for this reason its use generally is desired.

Figure 7:
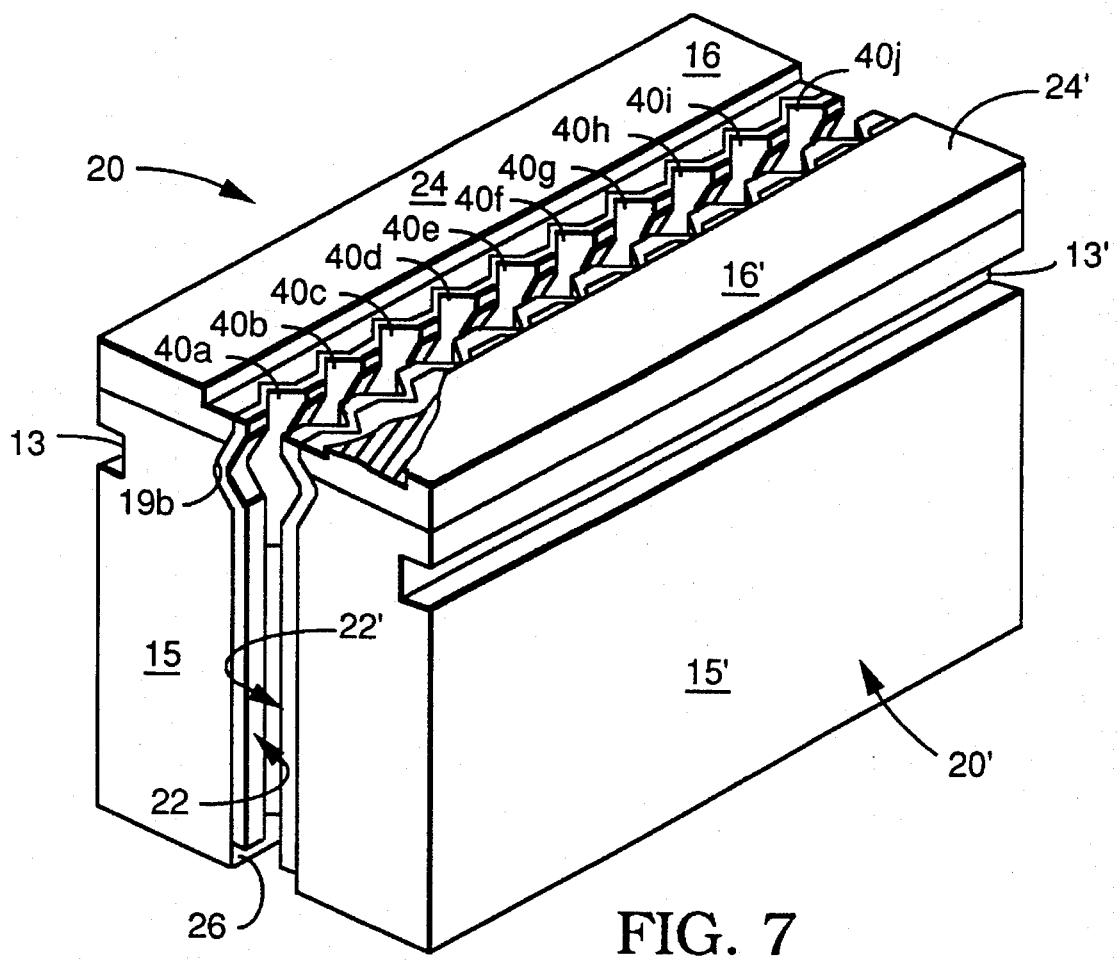

As shown in FIGS. 7 and 8, the two core halves 12, 12' (See FIG. 1) are portions of the two like block substrates 20, 20' which are placed in opposing facing relationship, with the pole faces of the individual blocks in aligned facing or face confronting relationship. The pole faces of the individual blocks 20, 20' are essentially those remaining abutting portions of the surface 22 on which the aforedescribed layers, including core layer 18, have been sequentially deposited. The block, designated 20' is identical to the block 20 and, for ease of description, corresponding elements thereof are identified with the same reference numerals followed by a prime ('). With the blocks 20, 20' in facing abutting relationship, as can be seen, there is formed a box-shaped or generally diamond-shaped winding window 30 formed from the facing juxtaposition of the two window grooves 19b, 19b'. Upper and lower bonding grooves or channels are formed by the upper pair of bonding notches 28, 28' and the lower pair of bonding notches 26, 26'. The two workpiece substrates 20, 20' are then suitably clamped together for bonding.

Figure 2:
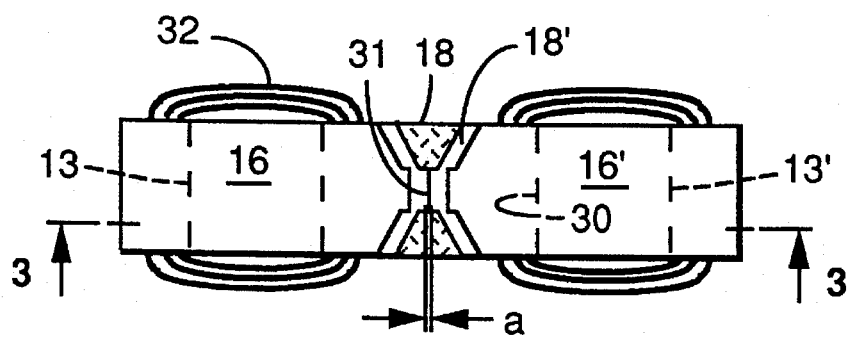
FIG. 2 is a top plan view of the composite metal and ferrite transducer of FIG. 1.
Figure 3:
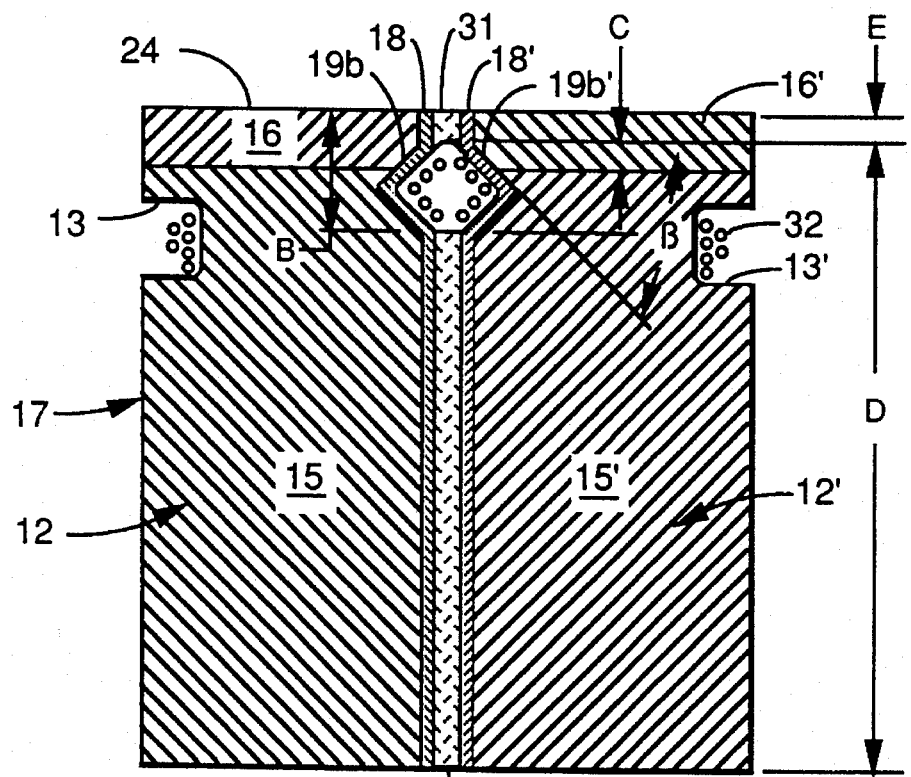
FIG. 3 is a front cross-sectional view of the composite metal and ferrite transducer of FIGS. 1,2 taken along section line 3—3 of FIG. 2.

In bonding the substrates 20, 20' together with a glass bonding technique, care must be exercised to preclude the entry of glass bonding material 57 (FIGS. 1, 2, 8–10) into the winding window. For this purpose, a two step bonding method is employed as described in the aforementioned U.S. patent application Ser. No. 07/846,454, which has been incorporated by reference. After glass bonding, the upper adjoined surfaces 24, 24' are then lapped along line L—L (shown in FIG. 8). Individual transducers 10, as illustrated in FIGS. 1 through 3, are then obtained by slicing or dicing the bonded composite block substrates 20, 20' along the cut lines 60 shown in FIG. 8. These cut lines 60 would normally be at an angle Ø relative to the side of the substrate block 20, 20' to create the desired angle for azimuth recording. While the individual transducers 10 can be sliced off one at a time, it would normally be the practice to gang slice all of the transducers 10 at the same time in a single pass. The thus bonded and sliced transducers would have the appearance of the transducer shown in FIG. 1 (minus the coil winding 32).

Figure 9:
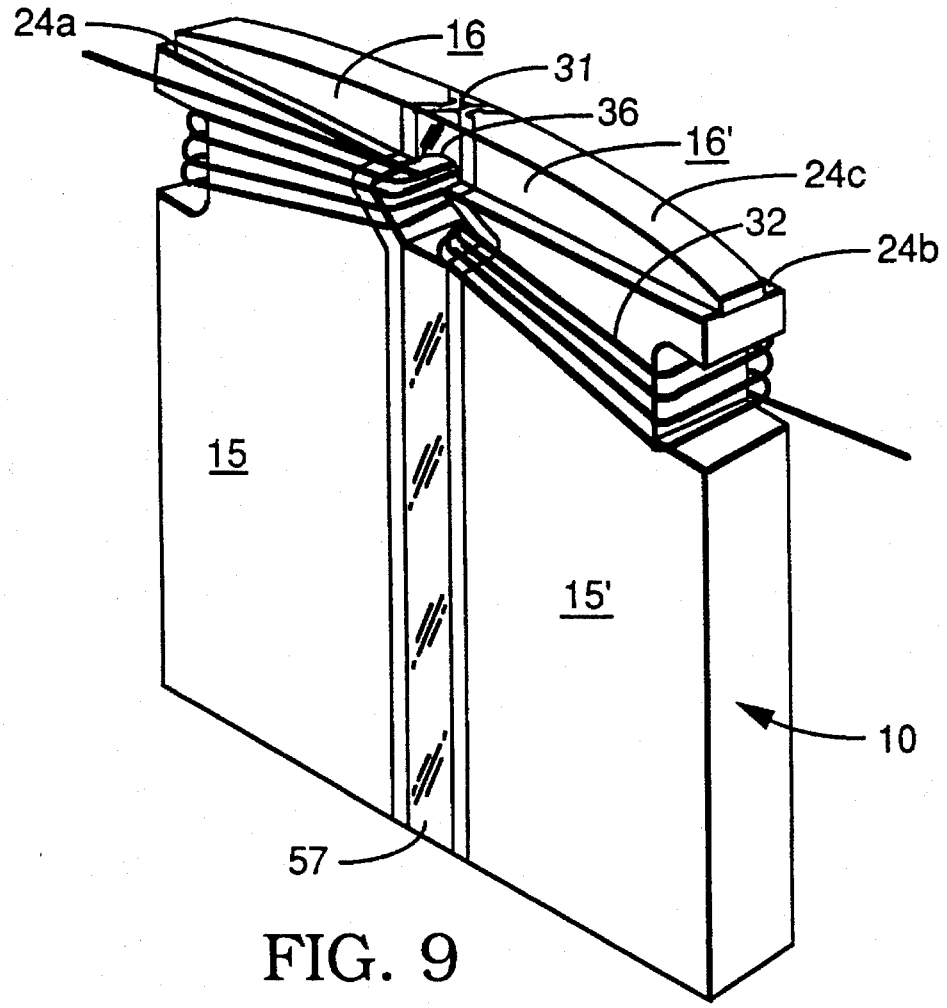
FIG. 9 is a perspective view of the composite metal and ferrite transducer of FIG. 1 with further processing for use on a rotary head assembly.

FIG. 9 shows the transducer 10 after further processing for use in a rotary head assembly. As shown, the transducer 10 has the head surface thereof rounded or contoured, with the head geometry further modified by the removal of portions to form lateral notches or shoulder portions 24a, 24b, which in the FIG. 9 embodiment, coincide with the junction between block 15 and cap block 16, thereby providing a narrow ridge portion 24c on which the tape moves. In dimension, the radius is such that at its highest point, which coincides with the gap 31 position, the dimension is of the order of 0.250 to 0.500 inch, while the width of the narrow ridge portion 24c is about 0.003 to 0.004 inch. This tape contact surface is formed in the non-magnetic block 16 material which may have high fracture toughness property such as when using Zirconia, thereby providing a transducer with outstanding wear characteristics as an attribute. For Example, the wear mechanism of head material in contact with metal particle tapes is predominately a fracture phenomenon rather than an abrasion phenomenon. Therefore, the fracture toughness is an important property in preventing transducer wear and thus extending transducer life. In practice, during assembly, this contouring and notching is performed prior to slicing the substrate blocks 20, 20'. First the head surface 24 is contoured; then, grooves of appropriate width are formed at the cut lines 60 (See FIG. 8); then the block is sliced along these grooves to provide the configuration as shown in FIGS. 9 and 10, with the track width TW being about 0.002 inch, the thickness W of the transducer being about 0.006 to 0.008 inch, and the thickness X of the resultant ridge 24c being about 0.003 to 0.004 inch, with the ridge centrally positioned relative to the thickness of the transducer.

The transducer 10 of the present invention is a tri-composite construction, that is, three different materials are utilized for different purposes in an assembled arrangement. The greater portion of the mass of the transducer 10 is the ferrite material 15 which is low reluctance and efficiently couples magnetic paths; the second material employed is the non-magnetic material 16 which forms the cap layer and provides a durability or resistance to wear under high head to tape speed contact with high coercivity magnetic tape; and the third material is the material which provides the metal in gap, which is the sputtered core legs 18, 18' of high permeability magnetic material.

Figure 10:
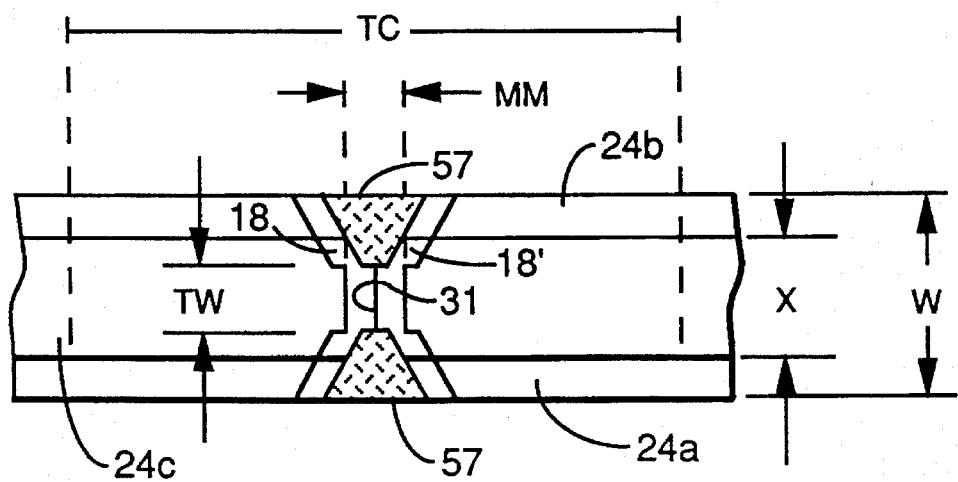
FIG. 10 is a diagrammatic partial top view of the processed transducer of FIG. 9.

By reference to FIG. 10, the upper surface or tape contact surface, which is predominantly layer 16, is depicted with two sets of vertical lines designated "TC" and "MM", these being respectively the tape contact dimension TC which is about 0.050 to 0.060 inch, and the magnetic material dimension MM, which is, at the center, about 0.0004 to 0.0005 inch. The ratio of the tape contact dimension TC to the magnetic material dimension X is about 15 to 1, this being referred to as the aspect ratio. For wear purposes, this is an important consideration in that it indicates the ratio of the tape contact between the harder non-magnetic material 16 and the metal material 18 of the gap, that is, for the most part, the tape is substantially in contact with the non-magnetic material 16. Furthermore, by reference to this figure, another important advantage of the present invention, in addition to the tri-composite material construction, resides in the fact that not only are the pole faces 19a sputtered with the high permeability magnetic material to form core legs 18, but the adjacent tapered sections 22a, 22b (See also FIG. 4) are also coated with the high permeability magnetic material. This effectively increases the cross-sectional area of the magnetic material of the core legs 18, thereby effectively decreasing the reluctance of the magnetic path between the magnetic tape and the ferrite material 15 and windings 32. Since the reluctance of a magnetic structure is R=l/Aμ, the reluctance is directly proportional to the path length ("l") and inversely proportional to the effective cross-sectional area of the magnetic material (A), and by increasing this area, reluctance is correspondingly reduced.

On an overall basis, and by way of example, the length and width of an individual transducer 10 is of the order of 0.100 and 0.08 inches, respectively, while the thickness is of the order of 0.008 inch. By reference to FIG. 2, the gap length, designated "a", is on the order of about 10–15 micro inch (playback head) or 20–25 micro inch (record head). By reference to FIG. 3, the dimension "B" from the bottom of the winding window to the upper surface of cap block 16 is about 0.025 inch. The dimension of "C" is about 0.0006 inch, that is, the bottom of the cap blocks 16, 16' to the bottom of the gap. The distance E between this upper apex and the upper tape contact surface 24, that is, the gap depth, is about 0.0005 to 0.001 inch. The signal coil window size in the vertical direction is about 0.024 inch, which is greater than the corresponding window of the transducer of the aforementioned patent application Ser. No. 07/846,454. The distance "D" which is the vertical distance from the upper apex of winding window 30 to the bottom of the transducer is about 0.095 to 0.106 inch.

As a consequence, the coil 32 can incorporate a larger number of windings, the magnetic path of which is primarily in the ferrite material 15, yet closely adjacent the tape contact surface due to the minimal spacing between the upper apex of the winding window 30, and the non-magnetic cap block 16, with the winding window 30 (formed by grooves 19b, 19b' and respective core layers 18, 18') being substantially filled with the turns of the coil 32. Further, the coil 32 lies along a line generally parallel to the surface 24 at a distance of about 0.002 to 0.025 inch from the path of the surface of the magnetic media or tape. As best shown in FIG. 3, the window formed by the grooves 19b, 19b' is approximately square, with the angle β the of the grove 19b, 19b' being about 45 degrees.

In such a metal-in-gap transducer 10, the magnetic path encounters two gaps, the front gap 31 and the back gap inside the ferrite core sections 15, 15'. The front gap is that portion of the facing abutting core legs 18, 18' lying between the upper apex of the winding window 30 (formed from the confronting pair of notches 19b, 19b') and the upper surface 24, 24c, with the back gap being that portion of the facing abutting core legs 18, 18' between the lower apex of the winding window 30 and the lower facing surfaces of the transducer core sections terminating in notch 26. With the large surface area of the gap confronting surfaces in the back gap relative to the area of the gap confronting surface of the front gap, coupled with the back gap being totally included within the region of the ferrite material of blocks 15, 15', the back gap provides an extremely low reluctance path compared to the front gap (which may be within the region of the non-magnetic material of block 16), as a result of which the flux concentration is at the front gap in very close proximity to the coil 32. With the small size of the transducer 10 constructed in accordance with the instant invention, the inductance per turn of the windings of the coil 32 is also reduced, thus allowing more turns for a given resonant frequency, which will result in more head output voltage without the need for a matching transformer.

Figure 11:
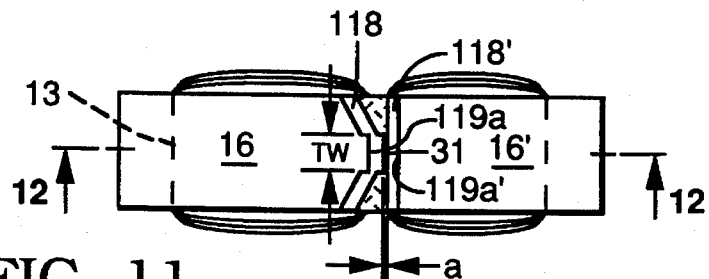
FIGS. 11 and 12 are top and side plan views of an alternative embodiment of the invention.
Figure 12:
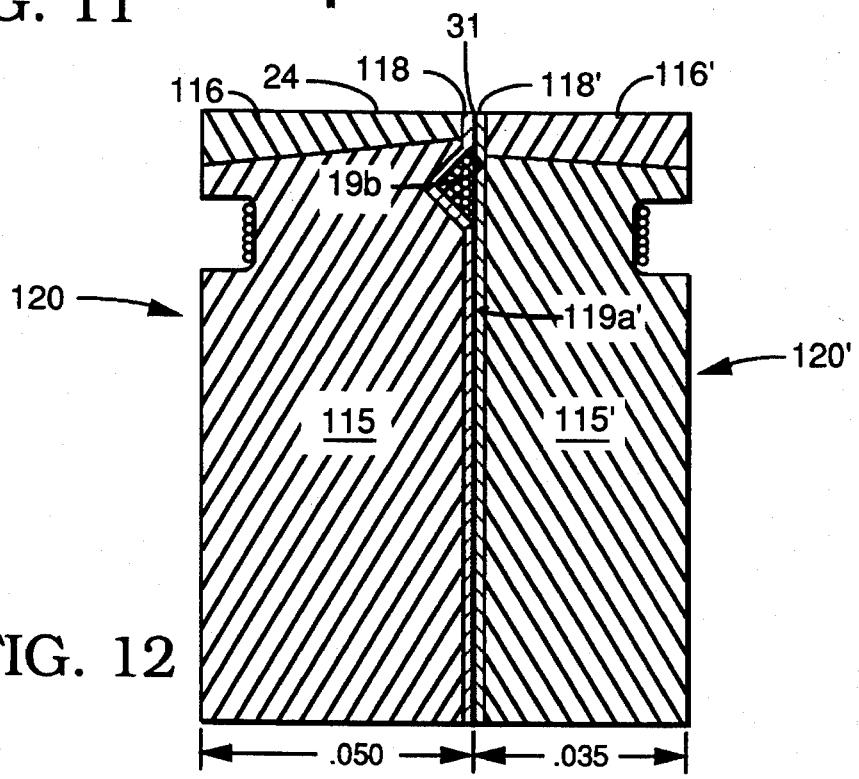
Figure 14:
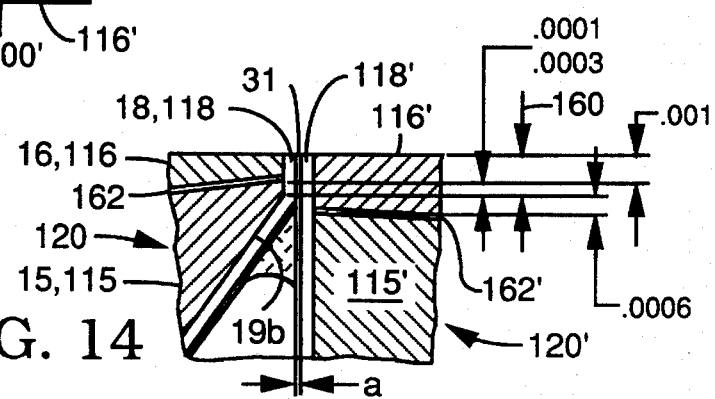
FIG. 14 is an enlarged front plan view of a section of the composite non-magnetic caps and ferrite substrates depicting the relative configurations of the caps, ferrite cores and winding window of an alternative embodiment.
Figure 15:
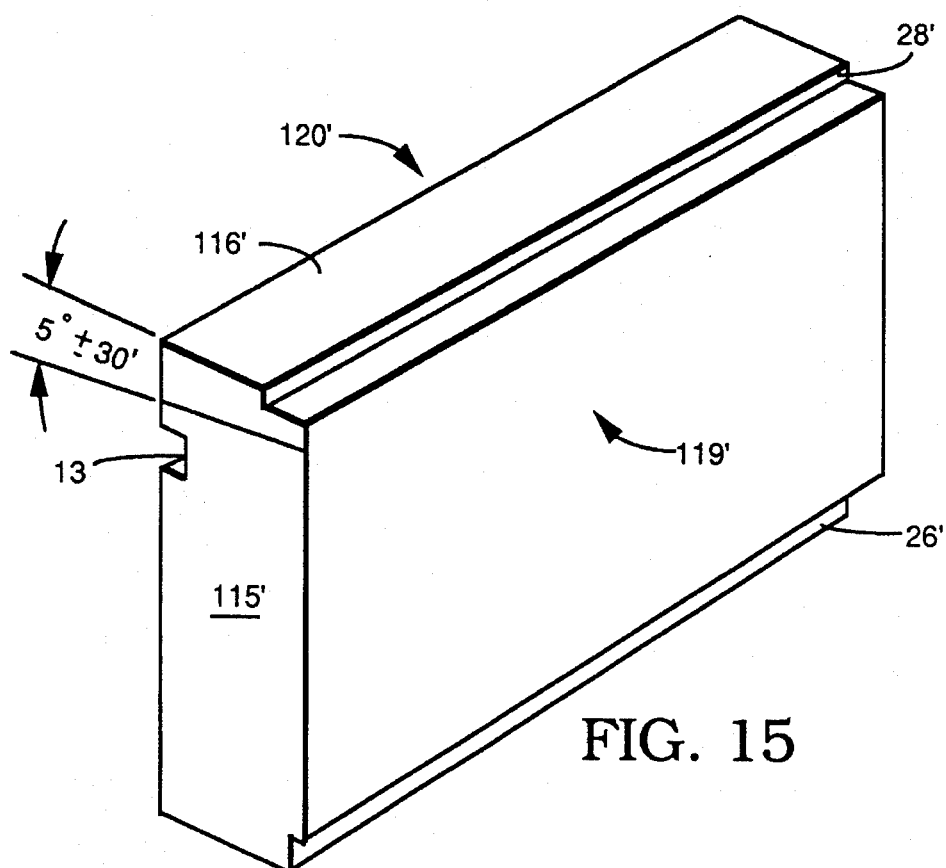
FIGS. 15-17 are perspective views showing the sequential method steps utilized in the fabrication and assembly of alternative magnetic core sections of the invention such as shown in FIGS. 11, 12, 13 and 14.
Figure 16:
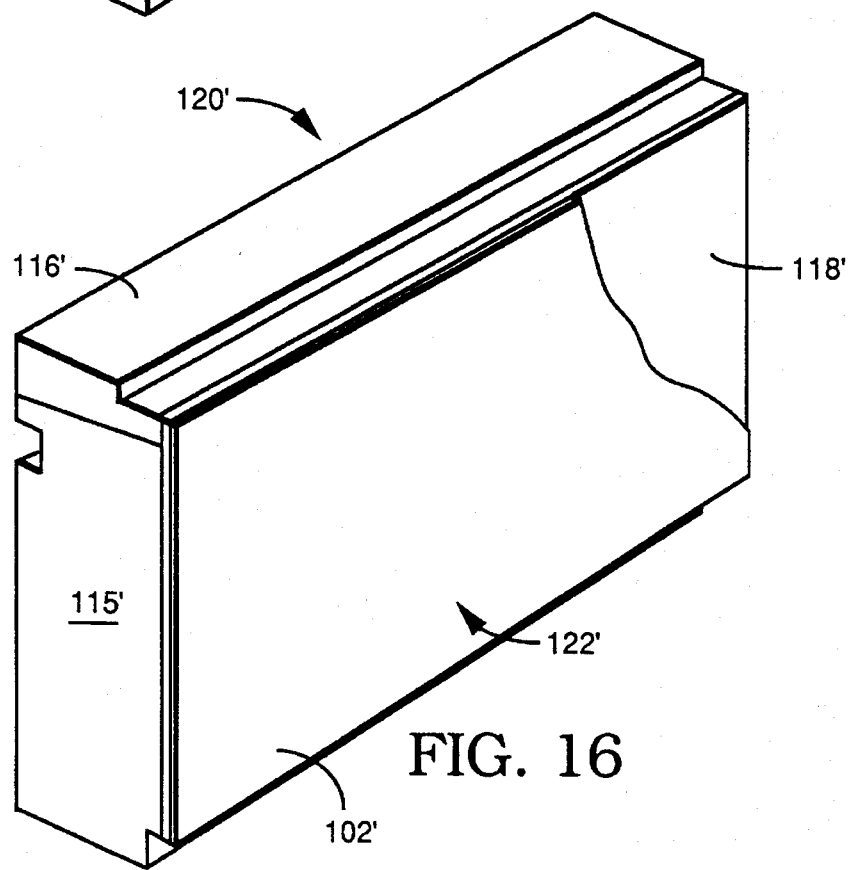
Figure 17:
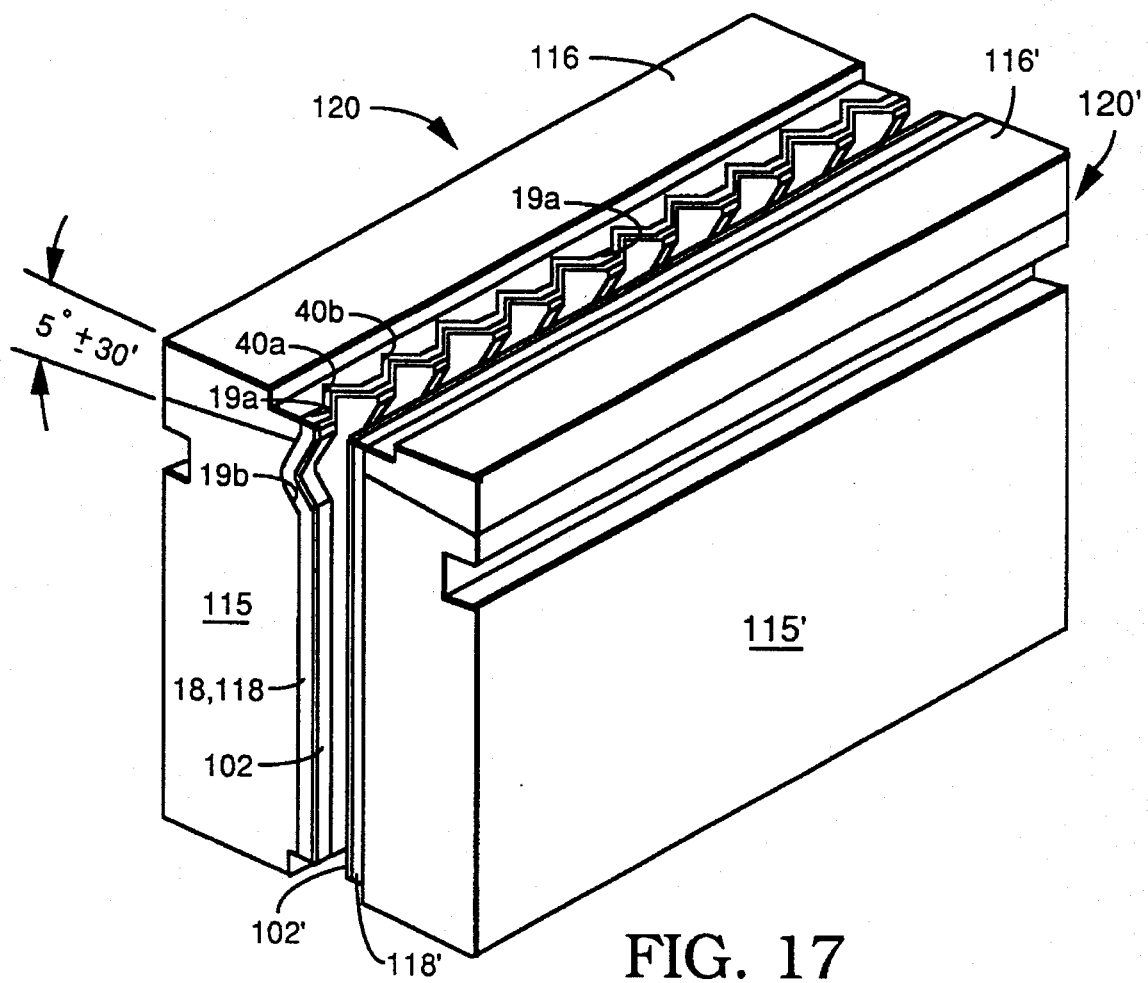
Figure 18:
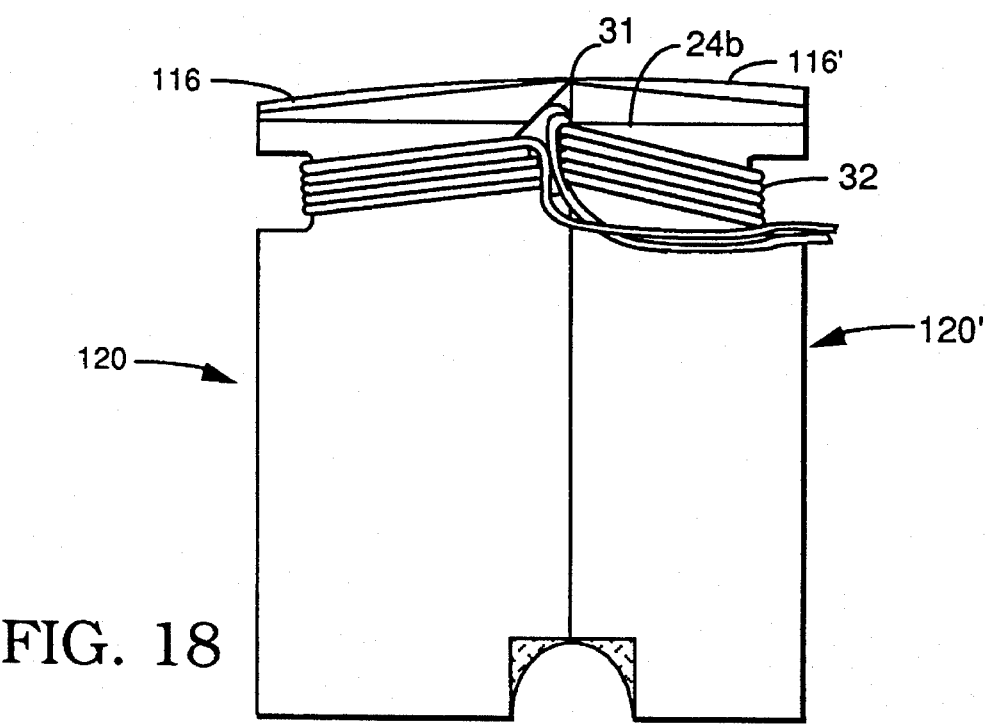
FIG. 18 is a front plan view of a finished transducer of, for example, FIG. 11.

FIGS. 11–18 depict alternative embodiments of the invention. FIGS. 11,12 depict one combination of features. FIGS. 13,14 show portions of the alternate embodiments of the invention in enlarged detail and FIGS. 15–17 illustrate alternative sequential method steps utilized in the fabrication and assembly of the alternative embodiment of, for example, FIG. 11. FIG. 18 shows a finished transducer in which the cap tape bearing surface has been contoured and polished and the coil installed. As before, similar components in the figures are similarly numbered.

Figure 6:
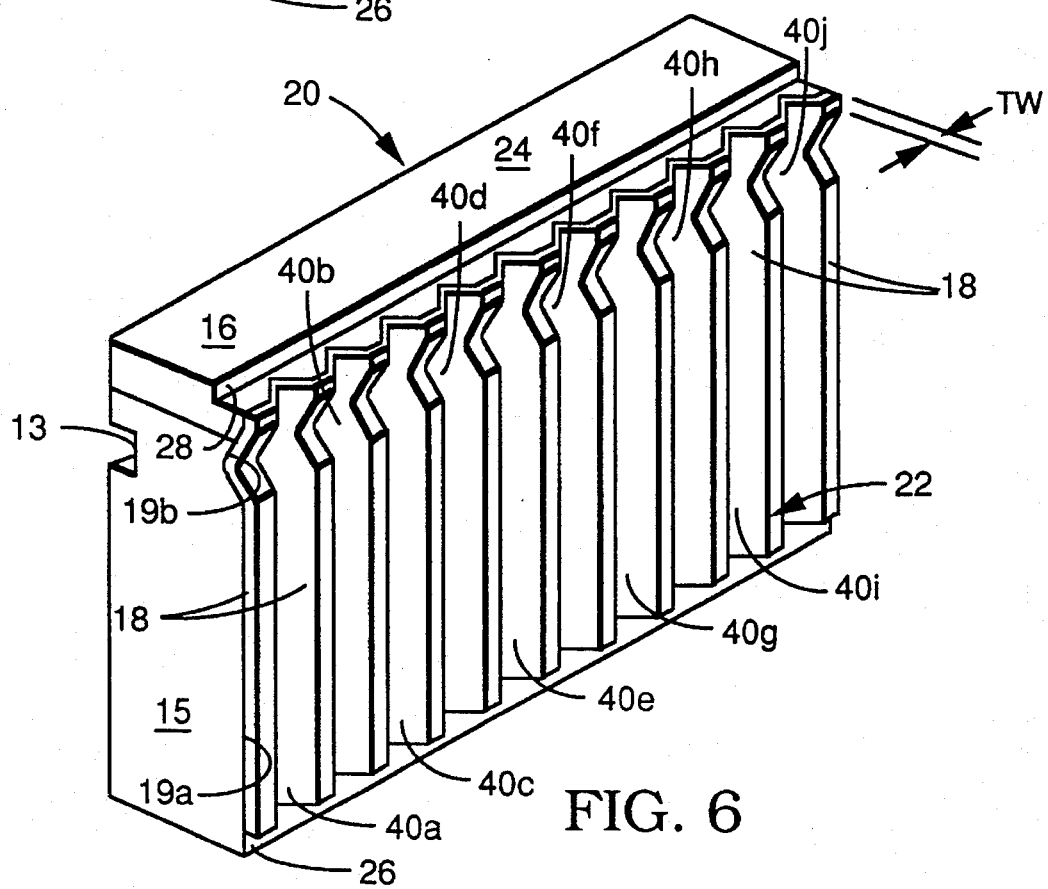

FIGS. 11 and 12 illustrate a single transducer structure wherein during the fabrication process, the track width defining grooves 40a–40j as well as the winding window groove 29b are formed in only one of the two composite block substrates that are subsequently bonded together and sliced as previously described, to form the transducer of FIGS. 11, 12. Such a configuration is provided beginning with a composite block substrate 120 such as depicted in FIGS. 5, 6 which contains the grooves 40a–40j as well as window groove 29b, and combining it with a flat surface substrate 120' of FIGS. 15–17 which has no grooves formed in the surface 119'. To this end, a beveled or wedge-shaped non-magnetic cap block 116' (rather than the rectangular solid of the previous embodiment) is bonded to a respective ferrite block 115' (in FIGS. 15–17) and a similar wedge-shaped non-magnetic cap block 116 is bonded to a respective ferrite block 115 as depicted in FIG. 17. The bonding layer is depicted in FIG. 14 via the numerals 162,162' As further depicted in FIGS. 12, 14 the width of the substrate 120', in the direction of medium movement over a transducer, is less than that of the substrate 120. In addition, wedge-shaped cap blocks 116, 116', also may be of different thicknesses such as shown in greater detail in FIG. 12 and enlarged FIG. 14. Alternately, the wedge-shaped cap blocks may be of the same thickness as depicted by the previous rectangular solid configurations of FIGS. 1–10. In the recorder apparatus in which the instant transducer is being used, the cap blocks are beveled at an angle of the order of 5 degrees plus or minus 30 seconds. However, the angle can be varied considerably depending upon the environment in which the resulting transducer is used.

The flat surface 119' of the composite block substrate 120' of FIG. 15 then has deposited thereon a very thin adhesive chrome layer barrier (100' in FIG. 13) followed by a high permeability magnetic layer 118' such as Alfesil. As described before, another very thin chrome layer (100' in FIG. 13) is deposited on the Alfesil layer 118' and one-half of the head gap 31 is deposited on the chrome layer as a layer 102' (also FIG. 13) of insulating material such as aluminum oxide, silicon dioxide, etc. The substrate 120' then is assembled and bonded to the substrate 120 of FIGS. 5–8 in facing abutting relation as previous described and as shown in FIG. 17. As also previously described, the assembled substrates are sliced into the individual transducers illustrated in FIGS. 11–14, 18. The FIG. 18 illustrates a finished transducer which has had the non-magnetic cap block 116, 116' shaped and polished to provide the finished tape bearing surface with desired cap block thickness relative to gap depth as established by the confronting magnetic layers 118, 118' (or 18, 18') in the region extending from the winding window to the tape bearing surface.

FIG. 14 illustrates a preferred transducer configuration in the region of the gap 31, the confronting non-magnetic caps 16 or 116, 116', the winding window 19b and the ferrite blocks 15 or 115, 115'. The cap 116 herein is of a thickness which is less than the gap depth 160, whereby the winding window 19b which generally defines the extent of the gap depth, does not extend into the non-magnetic cap 116. The cap 116' herein is thicker than the gap depth 160 and accordingly the winding window does extend into the region of the non-magnetic cap 116'. Such a gap/cap configuration provides the advantages of reducing the length of the magnetic path which reduces the reluctance of the high permeability magnetic layer.

The small physical size of the magnetic core results in an extremely short magnetic path length. By having the magnetic path extremely short, the core reluctance becomes less dependent on the core permeability, resulting in significant gains in flux efficiency in the high frequency range, for example in the 100 to 150 MHz frequency range. The entire transducer 10 is fabricated by high volume production, extremely high accuracy, and low cost techniques such as material deposition and sputtering processes. With batch fabrication, all of the magnetic core material for a large number of transducers 10 is deposited during the same process step and all of the transducing gaps are formed at the same time. This results in a high degree of uniformity for all of the transducers 10. In contrast to totally ferrite heads of similar dimensions, the metal in gap transducer 10 of the present invention exhibits significant improvement in signal levels in the frequency range of interest, and a significant reduction in the noise level associated with tape contact with the transducer. In addition with the composite head structure, the non-magnetic material may be selected according to wear characteristics for the unit.

The construction of the transducer in its various embodiments is economical, straightforward and uncomplicated, and the ultimate in simplicity. The transducer 10 of the present invention is essentially two sputtered core legs on the formed facing edges of a composite substrate. The fabrication techniques are simple and uncomplicated resulting in a low cost, highly flux efficient unit utilizing conventional readily available fabrication equipment.

A wide variety of modifications and improvements to the composite metal and ferrite high frequency, magnetic transducer and manufacturing method therefor described herein are believed to be apparent to those skilled in the art. For example, the winding window groove may be formed in both block substrates, whereby the winding window is in both magnetic core sections. Similarly, the track defining grooves and resulting raised portions may be formed in one or both block substrates as previously discussed, and further with either a single or double winding window configuration. Thus, the gap configuration depicted, for example, in FIG. 14 may be interpreted as a magnetic core section having a single raised portion or land (formed by a pair of grooves in only one block substrate) and confronting a flat facing edge in the opposite core section, in combination with a single winding window. FIG. 14 also may be interpreted as magnetic core sections having dual confronting raised portions or lands (such as shown in FIGS. 1,2) in combination with a single winding window. Likewise, the rectangular solid and/or the wedge-shape of the non-magnetic caps may be employed with either the single or dual raised portion(s) configuration of FIGS. 1,2 or FIGS. 11,12 and with either the single or dual winding window configuration. Accordingly, no limitation on the present invention is intended by way of the description herein, except as set forth in the appended claims.

What is claimed is:

1. A ring-type magnetic transducer for reproducing and/or recording high frequency signals via tracks in a magnetic medium, and including a pair of abutting composite core sections having core facing edges thereof separated by a gap and bonded together to define a medium bearing surface generally perpendicular to said core facing edges and encompassing said gap, said surface and said gap being configured for placement adjacent the magnetic medium, said core facing edges including a winding window having a signal coil disposed therethrough, the transducer comprising:

the abutting composite core sections including substrates of a magnetic material bonded to caps of non-magnetic Zirconia said Zirconia caps forming said surface and generally confining between the core facing edges thereof a front magnetic transducing gap for coupling a longitudinal magnetic field to the medium, said core facing edges being formed of abutting edges of said magnetic material substrate and said non-magnetic Zirconia caps so as to extend parallel to and generally define said front magnetic transducing gap;

said Zirconia material having an optimum fracture toughness property and attendent exceptional wear property;

at least one of said core facing edges including a raised land formed thereon in confronting relation to the opposite core facing edge, wherein the width of the land on the facing edge of the non-magnetic Zirconia cap determines the width of the tracks in the magnetic medium;

a thin layer of high permeability magnetic material deposited on the surface of said raised land of said at least one facing edge of a non-magnetic Zirconia cap;

said Zirconia caps having truncated wedge-shapes including a thinner end and an opposite thicker end, with the thinner ends of the caps forming the facing edges of the front magnetic transducing gap; and said Zirconia caps being formed a thickness of about 0.0002 to 0.003 inches in the region of the front magnetic transducing gap such that the front gap dimensions, in combination with the associated thin layers and closely adjacent winding window, provide a short magnetic path and decreased front gap magnetic reluctance for said ring-type magnetic transducer.

2. The magnetic transducer of claim 1 wherein the composite core sections each include raised lands on the respective facing edges of the non-magnetic Zirconia caps, wherein the raised lands are in register and define the track width of the transducer, and wherein said thin layer of high permeability material is deposited on both facing raised lands.

3. The magnetic transducer of claim 1 wherein the junction of at least one non-magnetic Zirconia material cap and magnetic substrate is within the depth of the front magnetic transducing gap.

4. The magnetic transducer of claim 3 wherein the depth between said surface and the winding window is of the order of 500 to 1000 micro inches and generally defines the front magnetic transducing gap depth at the start of head use.

5. The magnetic transducer of claim 1 wherein one composite core section includes the raised land formed on the facing edge thereof, and the other composite core section includes a flat facing edge of a width greater than that of the raised land with said thin layer deposited on the flat facing edge, wherein the raised land of the one core section abuts the flat facing edge of the other core section and generally defines the width of the tracks.

6. The magnetic transducer of claim 5 wherein the raised land extends along the facing edge of the non-magnetic Zirconia cap to define, along with the wider facing flat edge, the front magnetic transducing gap, and said thin layer of magnetic material is deposited on the facing edges including the raised land and the wider flat edge of the Zirconia caps.

7. The magnetic transducer of claim 1 wherein said window is configured, dimensioned and arranged so that a portion thereof protrudes into one junction of a non-magnetic Zirconia cap and magnetic substrate but not in the other junction.

8. The magnetic transducer of claim 1 wherein the depth of the facing edge of one non-magnetic cap is less than the depth of the facing edge of the other non-magnetic cap and the junction of at least one substrate and cap is within the front gap.

9. A ring-type magnetic transducer for reproducing and/or recording high frequency magnetic signals via tracks in a magnetic medium and including a pair of abutting core sections each of said sections being formed of a magnetic substrate bonded to a non-magnetic cap and having core facing edges formed of abutting edges of said magnetic substrate and said non-magnetic caps; said core facing edges being parallel to and generally defining a magnetic gap, said non-magnetic caps including a medium bearing surface extending generally transverse to said core facing edges, each core section having a thin layer of high permeability magnetic material deposited over said facing edges to form a front magnetic transducing gap between generally the facing edges of the non-magnetic caps, at least one of said core facing edges including a winding window adjacent said medium bearing surface, and coil means extending through said window and about the magnetic substrate in generally parallel relation with said surface, the transducer comprising:

at least one of said core facing edges of a non-magnetic cap including a raised land formed thereon in confronting relation to the opposite core facing edge, said facing edges and the raised land of said cap generally defining said front magnetic transducing gap, wherein the width of the land on the non-magnetic cap defines generally the width of the tracks;

said thin layer of high permeability magnetic material being deposited over the raised land on the facing edge of the non-magnetic cap and the facing edge of the abutting core section to form said front magnetic transducing gap in the region of the thin film on the raised land of the non-magnetic cap and the facing edge of the abutting core section;

said caps having truncated wedge shapes which decrease in thickness from the outer ends thereof to define thinner ends towards the front gap, and wherein the depth of the facing edge of one non-magnetic cap is less than the depth of the facing edge of the other non-magnetic cap;

said facing edge and raised land of at least one non-magnetic cap having a minimized thickness of about 0.0002 to 0.003 inches which generally defines the front magnetic transducing gap depth at the start of head use; and wherein the minimized thickness of the non-magnetic cap and the adjacent location of the winding window and of the thin film on the cap's raised land, and thus said depth of the front magnetic transducing gap, provides a short magnetic path and correspondingly decreased front magnetic transducing gap reluctance and an optimized efficiency for said ring-type magnetic transducer.

10. The magnetic transducer of claim 9 wherein said non-magnetic cap material is Zirconia of optimum fracture toughness property.

11. The magnetic transducer of claim 10 wherein the magnetic substrates are tapered at a top surface thereof facing the medium bearing surface, and the non-magnetic Zirconia caps truncated wedge-shapes match the tapered top surface, wherein the wedge shapes include a thinner end with the thinner ends of the caps forming the non-magnetic cap portion of the respective facing edges.

12. The magnetic transducer of claim 9 wherein said winding window extends slightly into one of said non-magnetic caps and generally defines said depth of the front magnetic transducing gap.

13. The magnetic transducer of claim 9 wherein one core section includes the raised land formed on the facing edge thereof and the other core section includes a flat facing edge of a width greater than the raised land, wherein the raised land of the one core section abuts the wider flat facing edge of the other core section and generally defines the width of the tracks.

14. The magnetic transducer of claim 13 wherein said thin layer of high permeability magnetic material is deposited on said raised land and also on said wider flat facing edge of the abutting core section.

15. The magnetic transducer of claim 9 wherein the junction of at least one substrate and non-magnetic cap at the facing edges is within the depth of the front magnetic transducing gap.

16. A ring-type magnetic transducer for reproducing and/or recording high frequency magnetic signals via tracks in a magnetic medium and including a pair of abutting core sections, each of said sections being formed of a magnetic substrate bonded to a non-magnetic cap and having core facing edges formed of abutting edges of said magnetic material and said non-magnetic material, said core facing edges being parallel to and generally defining a magnetic gap, said non-magnetic caps including a medium bearing surface extending generally transverse to said core facing edges, each core section having a thin layer of high permeability magnetic material deposited over said core facing edges to define a front magnetic transducing gap between generally the facing edges of the non-magnetic caps, at least one of said core facing edges including a winding window adjacent said medium bearing surface, and coil means extending through said window and about the magnetic substrate in generally parallel relation with said surface, the transducer comprising;

at least one of said facing edges of a non-magnetic cap including a raised land formed thereon in confronting relation to the opposite core facing edge, said facing edges and raised land generally defining the front magnetic transducing gap, wherein the width of the land on the non-magnetic cap defines generally the width of the tracks;

said thin layer of high permeability magnetic material being deposited over at least the raised land on the facing edge of the non-magnetic cap and over the facing edge of the abutting core section to form said front magnetic transducing gap in the region of the raised land and thin film of the respective non-magnetic cap facing edge;

said caps being formed of Zirconia and having wedge shapes which decrease in thickness from the outer ends thereof towards the region of the facing edges of the non-magnetic caps and magnetic substrates which define the front magnetic transducing gap;

wherein a thickness of the facing edge of one non-magnetic cap is less than a thickness of the facing edge of the other non-magnetic cap at the front magnetic transducing gap to provide a stepped cap configuration in the region of the front magnetic transducing gap and winding window; and wherein the stepped cap configuration and the adjacent winding window, and thus the depth of the front magnetic transducing gap, provides a short magnetic path and an associated decreased magnetic reluctance for said ring-type magnetic transducer.

17. The transducer of claim 16 wherein the junction of at least one magnetic substrate and respective non-magnetic Zirconia cap at the facing edges is within the front magnetic transducing gap.

18. The transducer of claim 16 wherein one core section includes a single raised land on the facing edge thereof, and the abutting core section includes a flat confronting edge of greater width upon which a thin layer is deposited, wherein the single raised land of the one core section abuts the flat confronting edge of the abutting core section to form the front magnetic transducing gap between generally the stepped cap configuration, which land generally defines the width of the tracks.

19. The transducer of claim 16 wherein said non-magnetic Zirconia caps have truncated wedge-shapes of different thicknesses with the thinner ends of each cap forming the facing edges of the caps, wherein the winding window groove generally establishes the depth of the front magnetic transducing gap formed by the high permeability magnetic material layers, said winding window protruding into the junction of the thicker of the non-magnetic Zirconia caps but not into the junction of the thinner cap.

20. The transducer of claim 19 wherein the magnetic core section containing the thicker of the non-magnetic caps is smaller in its dimension along the magnetic medium direction of movement than is the other abutting core section.

21. A ring type magnetic transducer for reproducing and/or recording high frequency magnetic signals via tracks in a magnetic medium and including a pair of abutting core selections each of said sections being formed of a magnetic substrate bonded to a non-magnetic cap and having core edges formed of the confronting edges of said magnetic material and said non-magnetic material, said core facing edges being parallel to and generally defining a magnetic transducing gap, said non-magnetic caps including a medium bearing surface on said non-magnetic substrate generally transverse to said core facing edges, each core section having a thin layer of high permeability magnetic material deposited over said core facing edges to define a front magnetic transducing gap between the facing edges of the non-magnetic caps, at least one of said core facing edges including a winding window adjacent said medium bearing surface, and coil means extending through said window and about the magnetic substrate in generally parallel relation with said surface, the transducer comprising:

the facing edge of a first of said core sections having a raised land formed thereon in confronting relation to the opposite core facing edge;

the facing edge of a second of said core-sections having a flat core facing edge of a width greater than the width of the raised land;

wherein the raised land of the first core section abuts the wider flat core facing edge of the second core section to form the front magnetic transducing gap between generally the facing edges of the non-magnetic caps and generally defines the width of the tracks; and wherein the thickness of one non-magnetic cap is less than the thickness of the other non-magnetic cap to provide a stepped cap configuration in the region of the front magnetic transducing gap and winding window, to provide a short magnetic path and an associated decreased magnetic reluctance for said ring-type magnetic transducer.

22. The transducer of claim 21 wherein the non-magnetic caps are formed of primarily Zirconia of optimum fracture toughness and attendent exceptional wear.

23. The transducer of claim 21 wherein said magnetic substrates and respective non-magnetic caps are tapered at their junction surfaces, said caps having a truncated wedge-shape with thinner ends thereof forming the facing edges of the caps.

24. A ring-type magnetic transducer for reproducing and/or recording high frequency signals via tracks in a magnetic medium, and including a pair of abutting composite core sections having core facing edges separated by a gap and bonded together to define a medium bearing surface generally perpendicular to said core facing edges and encompassing said gap, said surface and said gap being configured for placement adjacent the magnetic medium, said edges including a winding window having a signal coil disposed therethrough, the transducer comprising:

the abutting composite core sections including substrates of a magnetic material bonded to caps of a non-magnetic Zirconia material, said Zirconia caps forming said surface and generally confining between the facing edges thereof a front magnetic transducing gap for coupling a longitudinal magnetic field to the medium, said bonded substrates and Zirconia caps having formed thereon said facing edges;

wherein the depth of the facing edge of one non-magnetic cap is less that the depth of the facing edge of the other non-magnetic cap and the junction of at least one substrate and cap is within the front gap;

said Zirconia material having an optimum fracture toughness property and attendent exceptional wear property;

at least one of said facing edges including a raised land formed thereon, wherein the width of the land on the facing edge of the non-magnetic Zirconia cap determines the width of the tracks in the magnetic medium;

a thin layer of high permeability magnetic material deposited on the surface of said raised land of said at least one facing edge of a non-magnetic Zirconia cap; and said Zirconia caps being formed of a thickness of about 0.0002 to 0.003 inches in the region of the front magnetic transducing gap such that the front gap dimensions, in combination with the associated thin layers and closely adjacent winding window, provide a short magnetic path and decreased front gap magnetic reluctance for said ring-type magnetic transducer.

* * * * *